(12) United States Patent
Dunipace

(10) Patent No.: US 8,638,575 B2
(45) Date of Patent: Jan. 28, 2014

(54) HIGH VOLTAGE STARTUP CIRCUIT

(75) Inventor: Richard A. Dunipace, Highland Village, TX (US)

(73) Assignee: Fairchild Semiconductor Corporation, San Jose, CA (US)

( * ) Notice: Subject to any disclaimer, the term of this patent is extended or adjusted under 35 U.S.C. 154(b) by 298 days.

(21) Appl. No.: 13/207,798

(22) Filed: Aug. 11, 2011

(65) Prior Publication Data

US 2012/0039096 A1    Feb. 16, 2012

Related U.S. Application Data

(60) Provisional application No. 61/372,793, filed on Aug. 11, 2010, provisional application No. 61/431,723, filed on Jan. 11, 2011.

(51) Int. Cl.
*H02M 1/00* (2007.01)

(52) U.S. Cl.
USPC ............................. 363/49; 323/901; 323/908

(58) Field of Classification Search
USPC ................. 323/901, 908, 238, 239, 288, 289; 363/49, 20, 21.01, 21.12; 327/143, 198
See application file for complete search history.

(56) References Cited

U.S. PATENT DOCUMENTS

| 3,908,159 | A | * | 9/1975 | Griffey | 363/54 |
| 4,695,936 | A | * | 9/1987 | Whittle | 363/21.1 |
| 5,812,385 | A | * | 9/1998 | Leu | 363/49 |
| 6,051,940 | A | * | 4/2000 | Arun | 315/307 |
| 7,221,128 | B2 | * | 5/2007 | Usui et al. | 323/207 |

* cited by examiner

*Primary Examiner* — Timothy J Dole
*Assistant Examiner* — Ivan Laboy Andino
(74) *Attorney, Agent, or Firm* — Sidley Austin LLP

(57) ABSTRACT

In one embodiment, a startup circuit for a power supply is provided. The startup circuit comprises a resistance coupled between a voltage source and a first node. A first capacitor, coupled to the first node, is operable to be charged by current flowing through the resistance. A first transistor has an emitter, a base, and collector, wherein the collector is coupled to the voltage source and the base is coupled to the first node. A diac circuit, coupled to the emitter of the first transistor, is operable to fire to turn on the first transistor, thereby allowing discharge of the first capacitor through the base-emitter junction of the first transistor. A second capacitor is operable to be charged by current related to a discharge voltage resulting from the firing of the diac circuit. The second capacitor operable to store charge to provide VCC voltage to a controller of the power supply.

19 Claims, 15 Drawing Sheets

HIGH VOLTAGE STARTUP CIRCUIT

CROSS-REFERENCE TO RELATED APPLICATION AND CLAIM OF PRIORITY

The present application claims the benefit of priority to U.S. Provisional Patent Application Ser. No. 61/372,793, filed Aug. 11, 2010, entitled, "High Voltage Startup Circuit and High Voltage Input Capacitor Balancing Circuit," and to U.S. Provisional Patent Application Ser. No. 61/431,723, filed Jan. 11, 2011, entitled, "Startup Circuit and Input Capacitor Balancing Circuit," the entirety of which is incorporated by reference herein.

BACKGROUND

Field of Invention

Power converters are essential for many modern electronic devices. Among other capabilities, a power converter can adjust voltage level downward (buck converter and its derivatives) or adjust voltage level upward (boost converter and its derivatives). A power converter may also convert from alternating current (AC) power to direct current (DC) power, or vice versa. A power converter may also function to provide an output at a regulated level (e.g., 5.0V or 5 amps). Power converters are typically implemented using one or more switching devices, such as transistors, which are turned on and off to deliver power to the output of the converter. Control circuitry is provided to regulate the turning on and off of the switching devices, and thus, these converters are known as "switching regulators" or "switching converters." Such a power converter may be incorporated into or used to implement a power supply—i.e., a switching mode power supply (SMPS). The power converter may also include one or more capacitors or inductors for alternately storing and delivering energy.

Power supplies, and controllers for the same, are used in many applications. Off-line low voltage applications are in the range of 85 VAC to 265 VAC which correspond to standard line voltages, e.g., for the United States, Europe, Asia, etc. High voltage (HV) applications can be anything above 265V, such as, for example, industrial power supplies (requiring up to 600V AC input), bias supplies for windmills (requiring up to 1000V AC inputs), solar panels (requiring "string" converters that can operate to 800V to 1000V DC input), ballasts (which can operate from approximately 85V AC to more than 480V AC), power factor pre-regulators in industrial lighting applications, and "smart meters" (that can operate on inputs ranging from around 85V to 576V AC or approximately 120V to 820V DC).

Meters for monitoring, e.g., electricity usage, can require power supplies ranging between 1 W and 15 W. Non-smart meters use power supplies of around 1 W. A "smart meter," which can be a meter having a communications link to a central location to monitor and control electricity usage, typically use higher power levels, for example, ranging between 5 W and 7 W during transmission.

Smart meters enable two-way communications between electric utilities and both consumer and business power users to attempt to improve delivery efficiency and the ability to control and regulate overall power consumption. They are part of the "Smart Grid" technology initiative.

A smart meter can include a power supply, a controller for the power supply, an input for receiving power (e.g., AC source), a measurement section, and a communications section. The communications section typically includes an radio-frequency (RF) subsection which receives and/or transmits RF signals to/from a meter reader, other meters (e.g., gas or water), or electrical appliances (e.g., refrigerator). A smart meter should be able to withstand up to 6000V transients at AC input. Furthermore, a smart meter can be used in or exposed to a wide range of application (e.g., from 85V to 900V). For this, all components at the front-end of the smart meter typically must be rated for this wide range or arranged in a certain way.

Specifications for smart meters allow continuous transmission so the power supplies need to be dimensioned for this higher power level. In addition, there are some special meters with power levels of over 15 W. Power supplies for meters can provide single outputs: 27 to 12 volts (or so), or dual outputs: 27 to 12V (or so) and 5V/3.3V. These power supplies are generally implemented using non-isolated flyback converters, but sometimes using buck or isolated flyback converters.

All power supply controllers need to be started when a sufficient input voltage is present in order to drive the first pulses to energize the power supply controller. In low voltage applications, the controller can simply be connected to the rectified standard line voltage. For other applications such as those above 265V, a controller may typically include a high voltage (HV) startup pin or terminal and related circuitry which are connected to receive and convert the HV power to the levels required by the controller.

SUMMARY

Briefly and generally, embodiments of the invention include a high voltage startup circuit. Embodiments of the invention also include a high voltage input capacitor balancing circuit. It is possible to use one or both of the inventive circuits in the same power supply. The startup and input capacitor balancing circuitry can be used in a wide range of applications, including low and high voltage applications. Embodiments of the invention also include power supplies having the start-up and input capacitor balancing circuitry. Further embodiments of the invention include a system (such as, a smart meter) incorporating such a power supply.

In one embodiment, a startup circuit for a power supply is provided. The startup circuit comprises a resistance coupled between a voltage source and a first node. A first capacitor, coupled to the first node, is operable to be charged by current flowing through the resistance. A first transistor has an emitter, a base, and collector, wherein the collector is coupled to the voltage source and the base is coupled to the first node. A diac circuit coupled to the emitter of the first transistor, is operable to fire to turn on the first transistor, thereby allowing discharge of the first capacitor through the base-emitter junction of the first transistor. A second capacitor is operable to be charged by current related to a discharge voltage resulting from the firing of the diac circuit. The second capacitor is operable to store charge to provide VCC voltage to a controller of the power supply.

In another embodiment, a startup circuit for providing a bias voltage comprises a resistance coupled between a voltage source and a first node. A first capacitor, coupled to the first node, is operable to be charged by current flowing through the resistance. A first transistor has a first terminal, a second terminal, and a control terminal, wherein the first terminal is coupled to the voltage source and the control terminal is coupled to the first node. A diac circuit, coupled to the second terminal of the first transistor, is operable to fire to turn on the first transistor, thereby allowing discharge of the first capacitor through the control-second terminal junction of the first transistor. A second capacitor is operable to be charged by current related to a discharge voltage resulting from the firing of the diac circuit. The second capacitor is operable to store charge to provide the bias voltage.

In yet another embodiment, a power supply comprises a resistance coupled between a voltage source and a first node. A first capacitor, coupled to the first node, is operable to be charged by current flowing through the resistance. A first transistor has a first terminal, a second terminal, and a control terminal, wherein the first terminal is coupled to the voltage source and the control terminal is coupled to the first node. A diac circuit, coupled to the second terminal of the first transistor, is operable to fire to turn on the first transistor, thereby allowing discharge of the first capacitor through the control-second terminal junction of the first transistor. A second capacitor is operable to be charged by current related to a discharge voltage resulting from the firing of the diac circuit. The second capacitor is operable to store charge to provide a supply voltage.

Important technical advantages of the present invention are readily apparent to one skilled in the art from the following figures, descriptions, and claims.

BRIEF DESCRIPTION OF DRAWINGS

For a more complete understanding of the present invention and for further features and advantages, reference is now made to the following description taken in conjunction with the accompanying drawings.

DETAILED DESCRIPTION

Embodiments of the present invention and their advantages are best understood by referring to FIGS. 1 through 9 of the drawings. In general, like numerals are used for like and corresponding parts of the various drawings.

High Voltage Startup Circuit

For high voltage supplies, embodiments of the invention can supply a properly scaled start-up voltage to many power supply controllers. All power supply controllers need to be biased via a start up supply so they can drive the first pulses to the output switch to get the supply running Once the power supply is running, the supply can provide the needed biasing to the controller via a Vcc or bias supply.

Figure 1A:
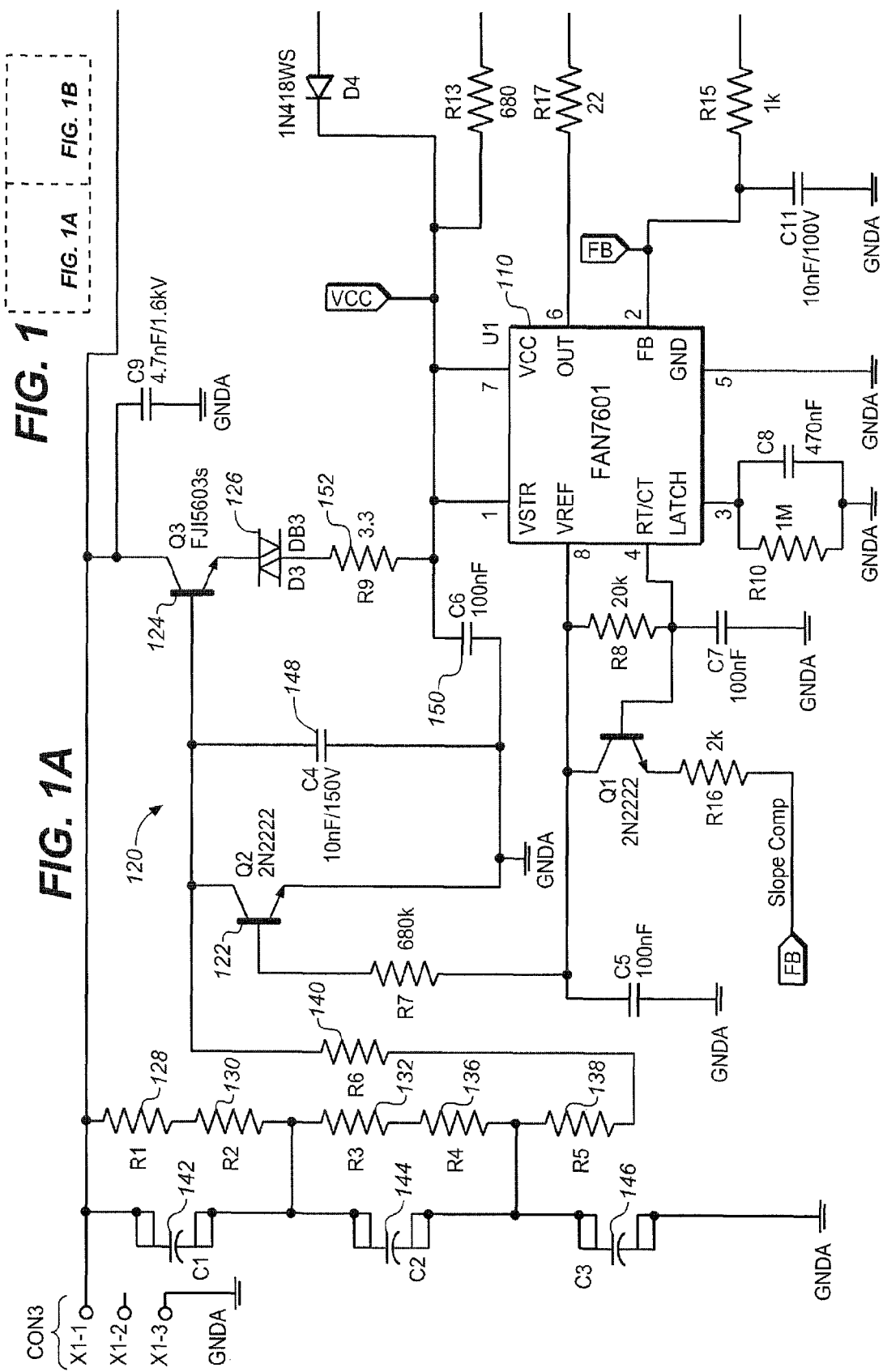
FIG. 1 is a schematic diagram of an exemplary implementation of a power supply with a start-up circuit.
Figure 1B:
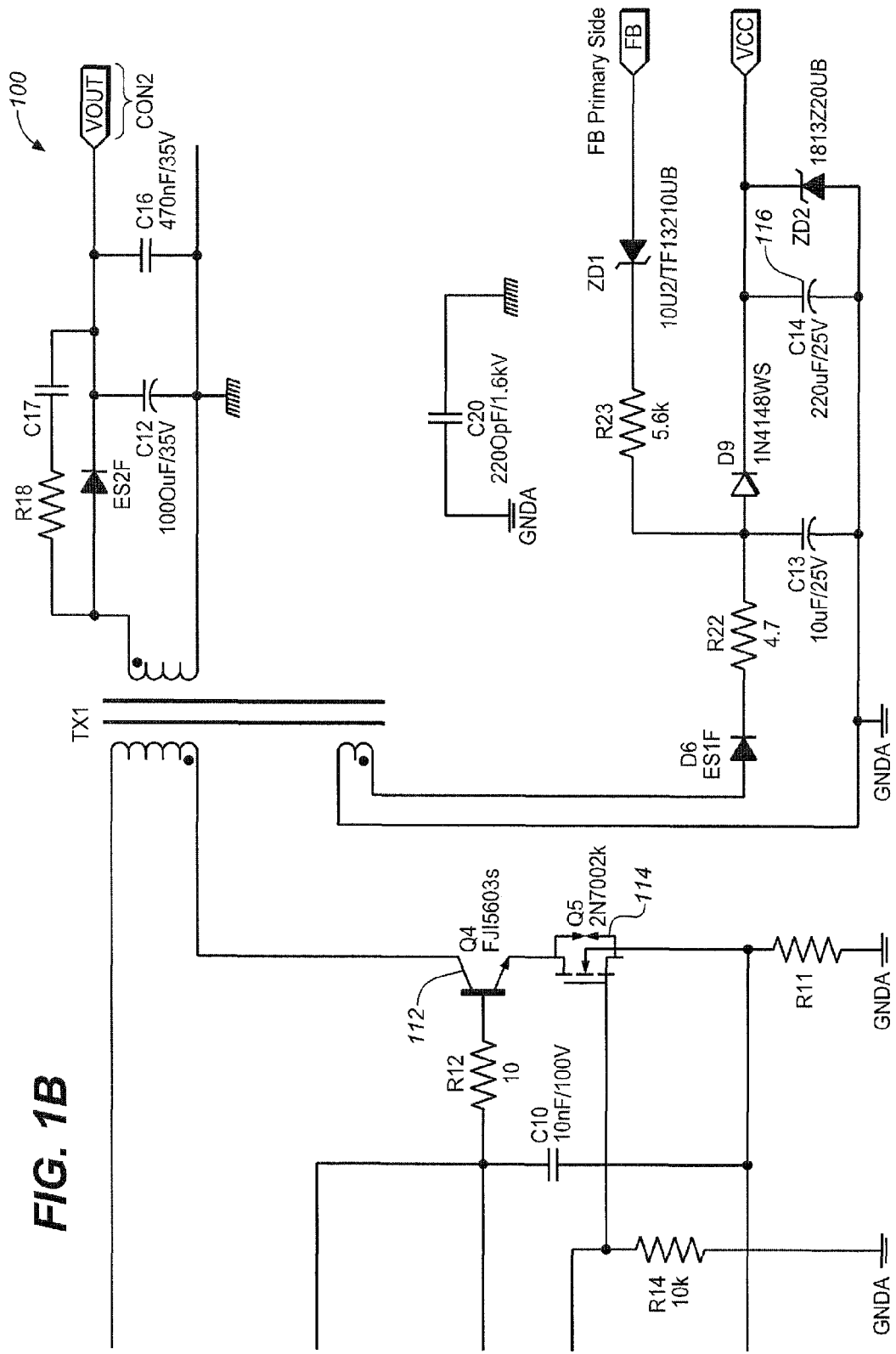

FIG. 1 is schematic diagram of an exemplary implementation of a power supply 100 according to an embodiment of the invention. Such power supply could be used or incorporated into a device, such as, for example, a smart meter, that is subject to or used in a wide range of applications, from low voltage to high voltage. The power supply 100 can be connected to a power source at input terminal (CONS) and operate with inputs ranging from around, for example, approximately 150V to 1200V DC. The power supply 100 provides power for the device (e.g., smart meter) at output terminal (CON2).

As shown, the power supply can be a flyback design modified to operate over a very wide input voltage range and at low power. These modifications result in good efficiencies over the full input voltage range and operating loads.

The power supply 100 can be a switching mode power supply (SMPS) having at least one switching device, which is turned on and off to deliver power to the output of the power supply 100. In this embodiment, power supply 100 includes an emitter-switched, BJT/MOSFET cascode, which is made up of a BJT 112 and a switching device 114 (also labeled as Q4 and Q5, respectively), in cascade so that a controller 110 drives the switching device 114 and the BJT 112 withstands the high-voltage. This makes the emitter-switched, BJT/MOSFET cascode easy to drive and delivers high performance switching at high voltages.

The switching device 114 may be implemented as a metal-oxide-semiconductor field effect transistor (MOSFET), but it is understood that such switching device 114 can also be implemented with other suitable devices such as, for example, insulated gate bipolar transistors (IGBTs), insulated gate field effect transistors (IGFETs), bipolar junction transistors (BJTs), etc.

The controller 110 generates a control signal which is provided to the control terminal of the switching device 114 for turning on and off the switching device 114 to provide AC drive to the transformer, output rectifier, and output regulator to produce a regulated voltage for current output. In some embodiments, for output voltage regulation, the control signal can be a pulse width modulation (PWM) control signal. In some embodiments, the controller 110 can be implemented with any suitable SMPS controller, such as, for example, as UC3845B or a FAN7601, both available from Fairchild Semiconductor Corp. The particular controller 110 in this illustrative embodiment does include a HV input terminal (VSTR).

The power supply 100 includes a high voltage startup circuit 120 which is connected or coupled to and provides startup VCC voltage for the controller 110.

Figure 2A:
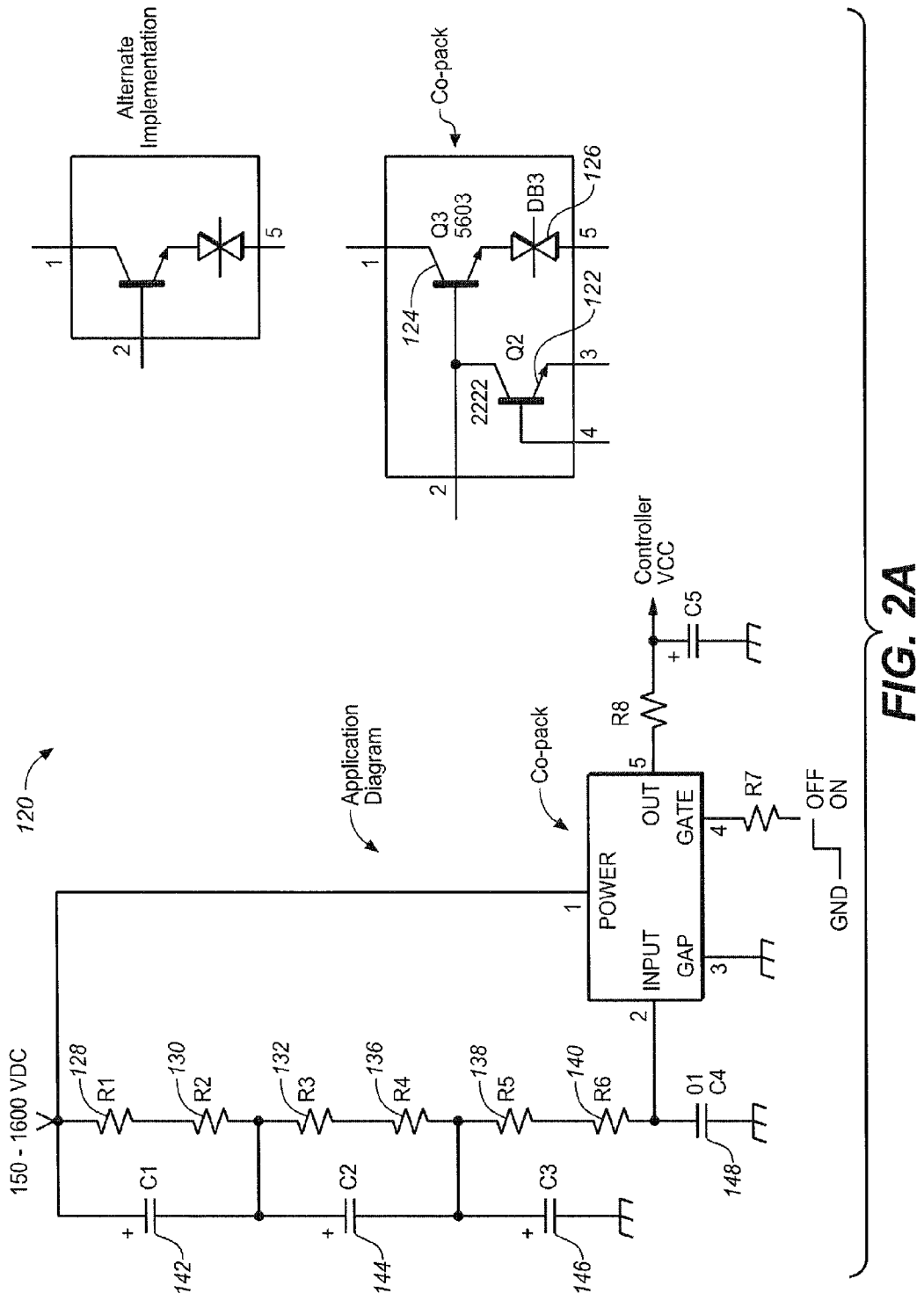
FIGS. 2A through 2C are schematic diagrams of exemplary implementations of a start-up circuit.
Figure 2B:
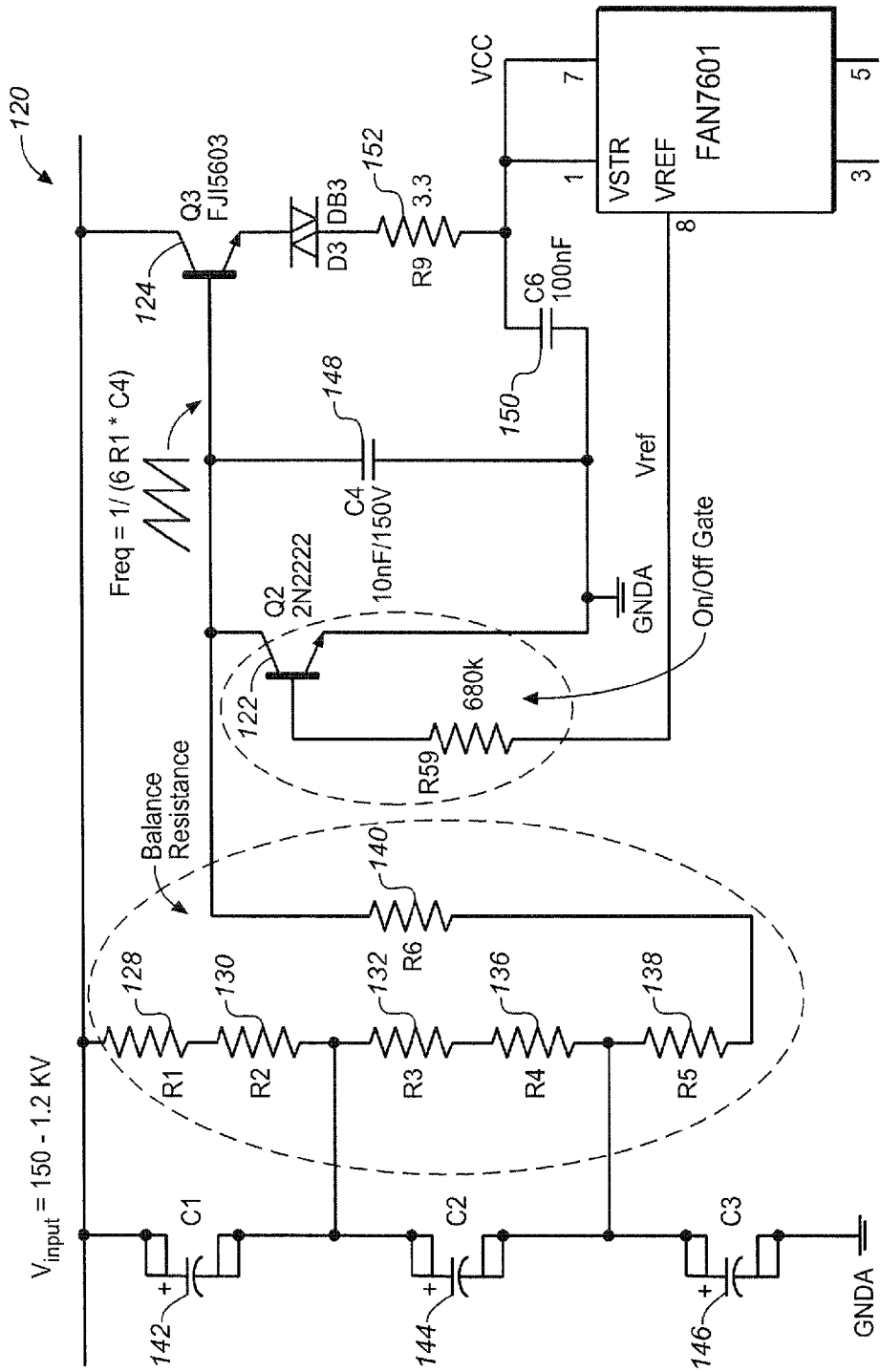

Details for the operation of a high voltage startup circuit are described with reference to FIGS. 2A through 2C. As shown in FIGS. 2A and 2B, in one embodiment, high voltage startup circuit 120 can include transistors 122, 124, and a diac circuit 126 (also labeled as Q2, Q3, and DB3, respectively). The transistors 122, 124 can be implemented, for example, as BJTs, IGBTs, MOSFETS, or any other suitable device. The diac circuit 126 can be implemented with a diac or a similar circuit or device functioning in a similar manner to a diac (e.g., two transistors (BJTs or MOSFETs coupled in a compound arrangement with positive feedback). In one embodiment, transistor 122 can be implemented with a FJP5089 or FJP2222, transistor 124 can be implemented with a FJP5603, and the diac circuit 126 can be implemented with a DB3, all available as semiconductor integrated circuits (ICs) from Fairchild Semiconductor Corp.

High voltage startup circuit 120 is a non-dissipative, active start-up circuit implemented to optimize converter efficiency for the power supply 100. In contrast, a pure resistive start-up circuit would dissipate power and have extremely low total converter efficiency due to the resistive dissipation versus low output power (2 W).

In some embodiments, the transistors 122 and 124, and the diac circuit 126 can be provided in the same or separate integrated circuit (IC) packages. In one embodiment, these components for high voltage startup circuit 120 may be provided in a single module ("co-package" or "co-pack"). With such configuration, as shown, the module has terminals, for example, for power, input, ground, gate, and out (FIG. 2A). High voltage startup circuit 120 can be coupled to the controller to provide VCC start-up power (e.g., at the out terminal). In the power supply, the start up circuit 120 can be coupled to the power source (e.g., 120V to 1200V DC) through start-up resistance and capacitance. The start-up resistance comprises a series of resistors 128, 130, 132, 136, 138 and 140 (also labeled as R1-R6, respectively), and the capacitance includes capacitors 142, 144 and 146 (also labeled as C1-C3, respectively). The startup resistors 128, 130, 132, 136, 138 and 140 can act as balance to ensure the same voltage drop across each input capacitor and to supply the current to the base of transistor 124 of the high voltage startup circuit 120. Furthermore, startup resistors 128, 130, 132, 136, 138 and 140 form a current source from the power source used to charge a capacitor 148 (also labeled as C4) of the power supply 100.

According to an embodiment of the invention, in operation for the high voltage start up circuit 120, the current through resistors 128, 130, 132, 136, 138 and 140 charge capacitor 148 as long as switching device 114 (FIG. 1) of the power supply 100 remains off. Capacitor 148 charges to a sufficiently high voltage (e.g., approximately 32 volts) so that the voltage on the emitter of transistor 124 of start up circuit 120 reaches the trigger voltage for the diac circuit 126. The diac circuit 126 fires and discharges capacitor 148 (about 10 volts) through the base-emitter junction of the transistor 124 and then turns off. The discharge voltage divided by a resistor 152 (also labeled R9) produces a pulse of current of around, for example, 0.3 A into the VCC storage capacitors 150 and 116 (also labeled as C14 in FIG. 1). Base current at transistor 124 turns it on. The gain of transistor 124 will multiply the discharge current to add to the current through the diac circuit 126. Once the diac circuit 126 turns off, capacitor 148 begins to charge up again in another cycle. Each charge cycle adds to the voltage on VCC storage capacitors 150 and 116. These cycles continue until the VCC voltage is sufficient for the controller 110 to start. Before VCC reaches the device threshold, the output of controller 110 is low and switching device 114 is off.

The high voltage startup circuit 120 can be turned off after use to minimize current draw. Specifically, once the controller 110 starts, the output (e.g., Vref for a FAN7601 implementation) of the controller 110 goes high turning on switching device 122. This in turn shunts the charging current for capacitor 148 to ground and turns off the high voltage startup circuit 120. Thus, once startup for the controller 110 is complete, the high voltage startup circuit 120 shuts down and the circuit dissipation is reduced, for example, to the order of <1 uW. If controller 110 stops, then high voltage startup circuit 120 will kick in again to bring VCC up to an appropriate level to allow the controller to restart. The high voltage startup circuit 120 can operate over a very wide input range—e.g., from 50V to 1500V DC.

Figure 2C:
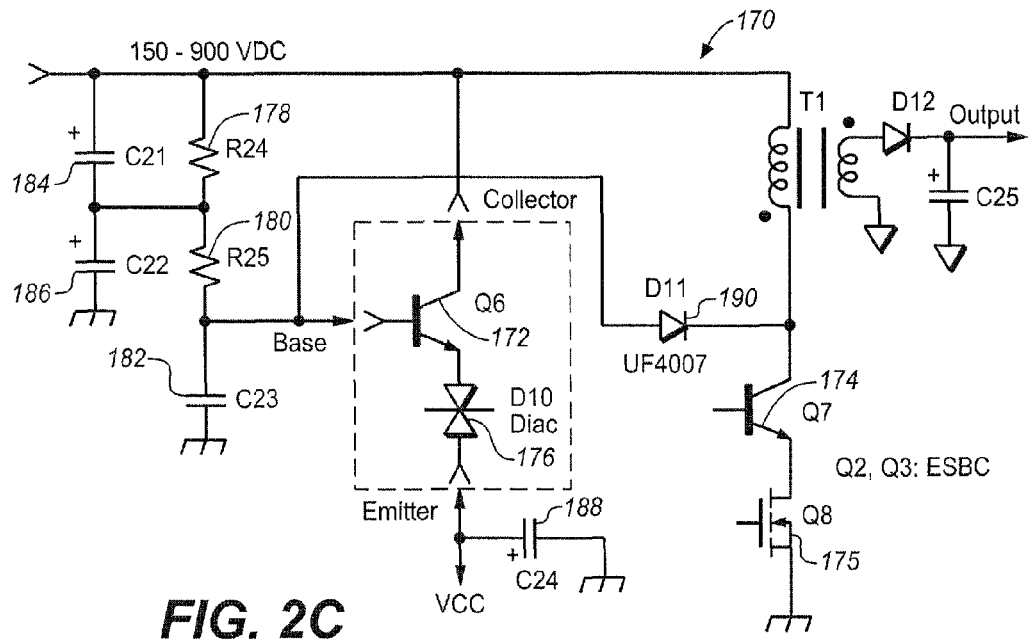

FIG. 2C is a schematic diagram of another exemplary implementation of a start-up circuit 170 for a power supply, like that shown in FIG. 1. Startup circuit 170 is a non-dissipative, active start-up circuit implemented to optimize converter efficiency for a power supply. In one embodiment, high voltage startup circuit 170 can include transistors 172, 174, 175 and a diac circuit 176 (also labeled as Q6, Q7, Q8 and 010, respectively). As shown, the transistors 172, 174 are implemented as BJTs and transistor 175 may be implemented as a MOSFET, but it is understood that such transistors may also be implemented with other suitable devices such as, for example, insulated gate bipolar transistors (IGBTs), insulated gate field effect transistors (IGFETs), etc.

In the power supply, the start up circuit 170 can be coupled to the power source through start-up resistance and capacitance. The start-up resistance comprises a series of resistors 178, 180 (also labeled as R24 and R25, respectively), and the capacitance includes capacitors 184, 186 (also labeled as C21 and C22, respectively).

In operation for the start up circuit 170, the current through resistors 178 and 180 charge capacitor 182 (also labeled as C23) as long as switching device 114 (FIG. 1) of the power supply remains off. Capacitor 182 charges to a sufficiently high voltage so that the voltage on the emitter of transistor 172 of start up circuit 170 reaches the trigger voltage for the diac circuit 176. The diac circuit 176 fires and discharges capacitor 182 through the base-emitter junction of the transistor 172 and then turns off. The discharge charges VCC storage capacitor 188 (also labeled as C24). Once the diac circuit 176 turns off, capacitor 182 begins to charge up again in another cycle. Each charge cycle adds to the voltage on VCC storage capacitor 188. These cycles continue until the VCC voltage is sufficient for the controller 110 (FIG. 1) to start. Before VCC reaches the device threshold, the output of controller 110 is low and switching device 114 is off. The high voltage startup circuit 170 can be turned off after use to minimize current draw. Once the controller 110 starts, the switching device 114 is turned on lowering the voltage on the collector of transistor 172 to less than 2V typically. The collector of transistor 174 also turns on a diode 190 (also labeled as D11), discharging the voltage on capacitor 182 so that the voltage never gets high enough on the base of transistor 172 to cause the diac circuit 176 to conduct. The pulses from the controller 110 operate at sufficiently high frequency so that the voltage on capacitor 182 stays discharged and the start up circuit 170 is effectively turned off.

Figure 2D:
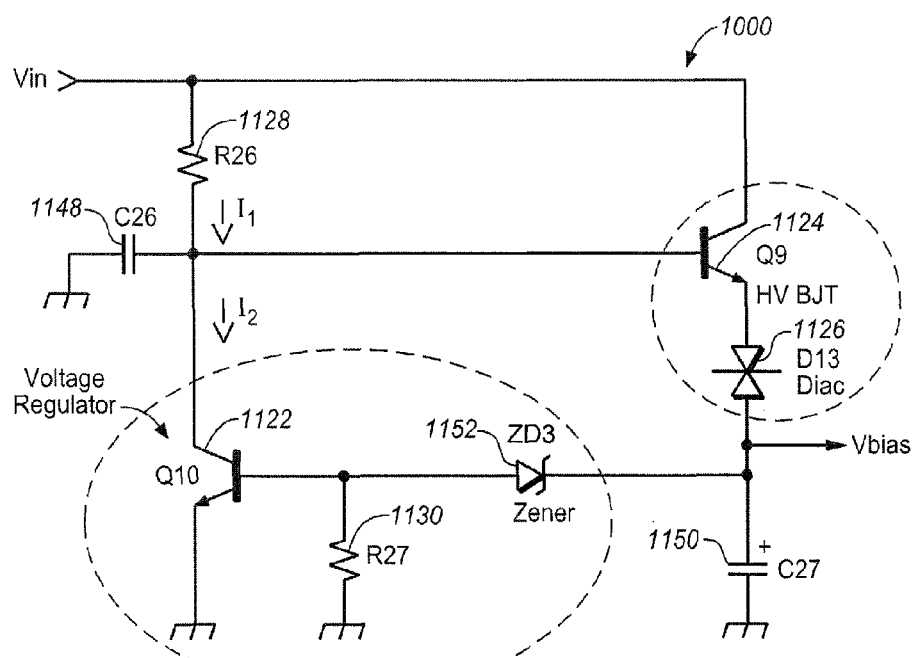
FIG. 2D is a schematic diagram of exemplary implementations of a power supply circuit.

The startup circuits (e.g., 120 and 170) can be used for other applications besides providing VCC for a controller in a power supply. In some applications, for example, the high voltage startup circuits can used as a current source or to flash LEDs from a high voltage input. Furthermore, such circuits can be themselves be used as a power supply. And with a voltage regulator added, the circuits can be used as a regulated power supply. FIG. 2D illustrates how the start up circuit could be used as a regulated power supply.

FIG. 2D is a schematic diagram of an exemplary implementation of a power supply circuit 1000. In one embodiment, power supply circuit 1000 can include transistors 1124, 1122, and a diac circuit 1126 (also labeled as Q9, Q10 and 013, respectively). As shown, the transistors 1122, 1124 are implemented as BJTs, but it is understood that such transistors may also be implemented with other suitable devices such as, for example, a MOSFET, IGBTs, IGFETs, etc. Power supply circuit 1000 also includes resistance 1128, 1130 (also labeled as R26 and R27, respectively), capacitors 1148, 1150 (also labeled as C26 and C27, respectively), and Zener diode 1152 (also labeled as ZD3).

In operation, current flowing from input voltage Vin through resistance 1128 charges capacitor 1148 until the voltage reaches the firing voltage for diac circuit 1126. When the diac circuit 1126 fires, it discharges capacitor 1148 through the base-emitter junction of transistor 1124. The gain of transistor 1124 will multiply the discharge current to add to the current through the diac circuit 1126. During discharge the voltage of diac circuit 1126 may drop from, for example, approximately 33V, to a few volts during conduction. Both diac circuit 1126 and transistor 1124 will remain on until the current through transistor 1124 drops to a point where the combined current of transistor 1124 and the capacitor 1148 discharge current can no longer keep the diac circuit 1126 conducting. Each current discharge cycle adds charge to capacitor 1150 which increases its voltage. Once the voltage reaches the breakdown voltage for zener diode 1152 and the base emitter voltage for transistor 1122, transistor 1122 discharges capacitor 1148 stopping the charge/discharge cycle and regulating the voltage on capacitor 1150 to provide a regulated voltage Vbias.

High Voltage Input Capacitor Balancing Circuit

Power supplies (e.g., SMPSs) may have one or more capacitors to filter the input power. Power supplies with inputs greater than 450V DC typically use stacked electrolytic capacitors for the input filter. These capacitors can introduce problems. All capacitors have leakage current. The leakage of the capacitors can be significant and varies from capacitor to capacitor initially, and over time and temperature. The unbalanced capacitor leakage produces different voltages across the stacked capacitors which can lead to premature failure.

The typical way to balance the voltage across stacked capacitors is to put balancing resistors across each capacitor. The voltage divides according to the ratio of the resistors instead of the capacitors. The resistor bleed currents are selected to be at least 10 times the expected worst-case capacitor leakage currents over time and temperature. This in itself is problematic because the bleed currents can be substantial, significantly increasing power consumption. More specifically, under normal working conditions, the balance resistances still dissipate a small amount of power; but this can be fairly low if the resistances are set fairly high. The typical value for such resistors is 200K ohm across each capacitor assuming the input capacitor values are below 33 uF at 450V. Two resistors are typically used to realize the 200K ohms to obtain adequate voltage breakdown. Thus, each resistor can be approximately 100K ohms The larger the capacitor value and the higher the operating temperatures, the higher the leakage currents through the capacitors and the lower the resistor values need to be to compensate. Unfortunately, the power lost via the balancing resistors is meaningful even under ideal conditions and maximum power output. This can be aggravated by the wide input operating range for the power supply.

To address or reduce this problem, a high voltage input capacitor balancing circuit, according to some embodiments, functions to balance the input capacitors in a high voltage power supply. In some embodiments, the high voltage input capacitor balancing circuit may be used or combined with a high voltage startup circuit to provide startup voltage (e.g., startup VCC) to controllers with HV startup capabilities. The divider losses can be reduced by up to 90% by actively driving the capacitor balance using a buffer with a gain of approximately one.

Smart meter supplies are sized based upon the worst-case power requirement. Smart meters draw most power during transmission/reception. Non-transmission power requirements (standby power) could be 10% or less of the maximum. During standby, fixed loads such as the input capacitor bleed resistors can be a substantial percentage of all power supply current. Thus, represent a significant loss during standby. Meters are typically run in standby most of their operating time. To maximize meter efficiency, a method needs to be employed to minimize capacitor balancing overhead power costs during standby.

Figures 3, 3A:
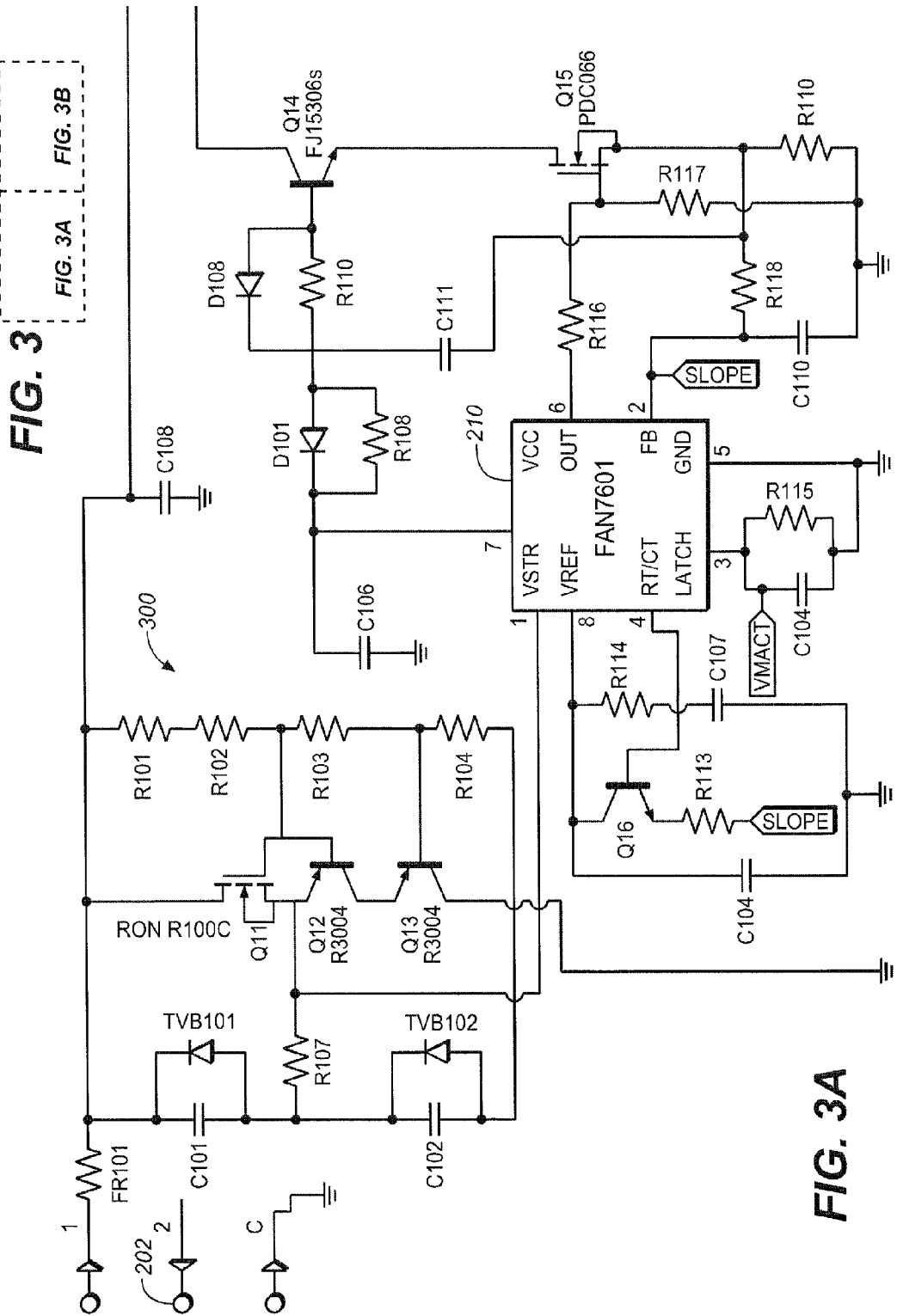
FIG. 3 is a schematic diagram of an exemplary implementation of a power supply with an input capacitor balancing circuit.
Figure 3B:
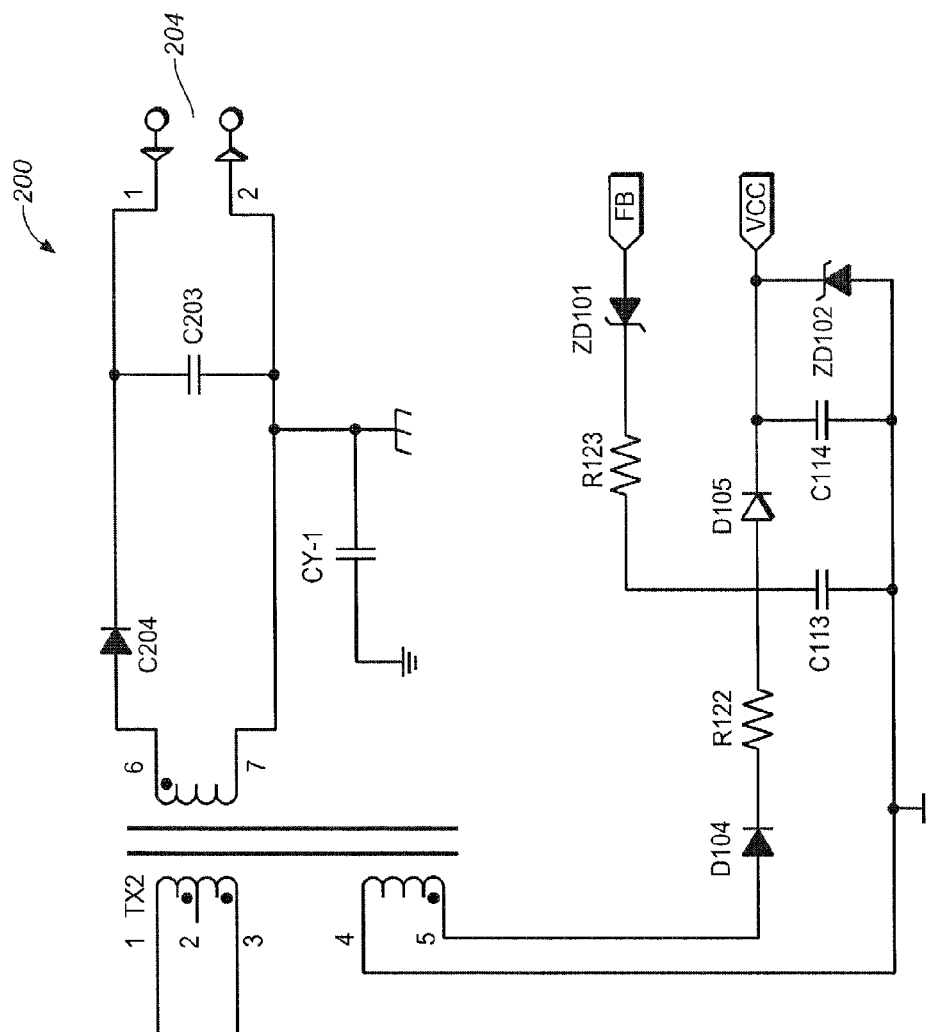

FIG. 3 is schematic diagram of an exemplary implementation of a power supply 200 according to an embodiment of the invention. Such power supply 200 could be used or incorporated in device, such as, for example, a smart meter, that is subject to or used in a wide range of applications, from low voltage to high voltage. The power supply 200 can be connected to a power source at an input terminal and operate with a wide range of input voltages, for example, approximately 120V to 850V DC. The power supply 200 provides power for the device (e.g., smart meter) at an output terminal.

Power supply 200 includes a switching controller 210 and a high voltage input capacitor balancing circuit 300. In one embodiment, switching controller 210 can be implemented with a suitable controller having an HV input pin, such, for example, a FAN 7601 switching controller available from Fairchild Semiconductor Corp. The high voltage input capacitor balancing circuit 300 can be implemented in a number of ways.

Figure 4:
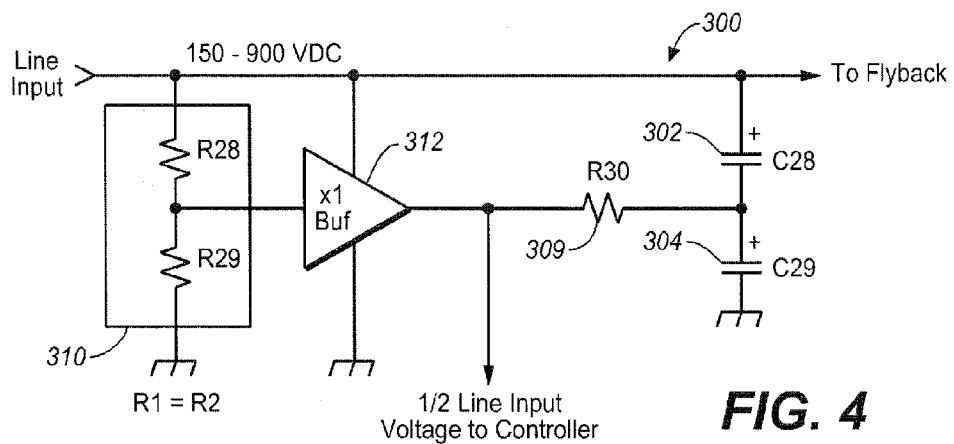
FIG. 4 is a schematic diagram of an exemplary implementation of a high voltage input capacitor balancing circuit for a power supply.

FIG. 4 is schematic diagram of an exemplary implementation of a high voltage input capacitor balancing circuit 300 according to an embodiment of the invention. High voltage input capacitor balancing circuit 300 can provide active balance for a two input capacitor configuration (capacitors C28 and C29) used as an input filter for a power supply. A resistor R30 limits the drive current to capacitors C1 and C2 given worst-case capacitance value imbalance and input voltage ripple.

Figure 5A:
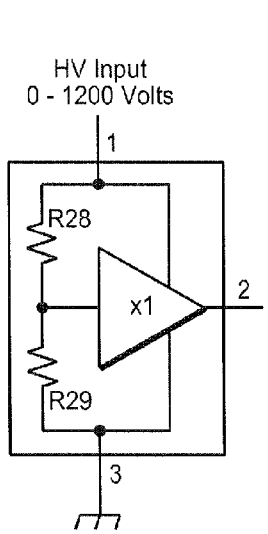
FIGS. 5A and 5B illustrate exemplary connection arrangements and configurations for the resistor divider and X1 buffer.
Figure 5B:
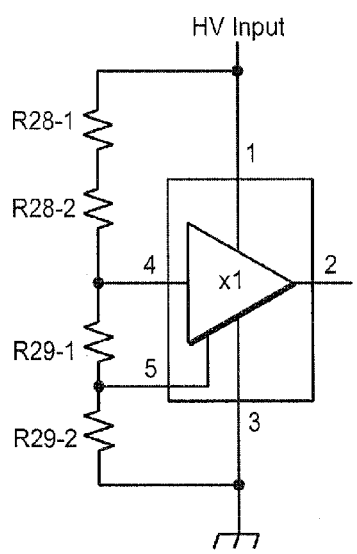

As shown, high voltage input capacitor balancing circuit 300 includes voltage divider 310 and a X1 ("times one") buffer 312. Voltage divider 310 can be set, for example, to be one-fifth to one-twentieth the normal required bleed current, given the values of capacitors C28 and C29 and their worst-case leakage current over time and temperature. In one embodiment, voltage divider 310 can be implemented with a plurality of resistors (e.g., R28 and R29 as shown) having values which provide the desired lower bleed current (e.g., one-fifth to one-twentieth the normal required bleed current). FIGS. 5A and 5B illustrate exemplary connection arrangements and configurations for the resistor divider 310 and X1 buffer 312.

Figure 6:
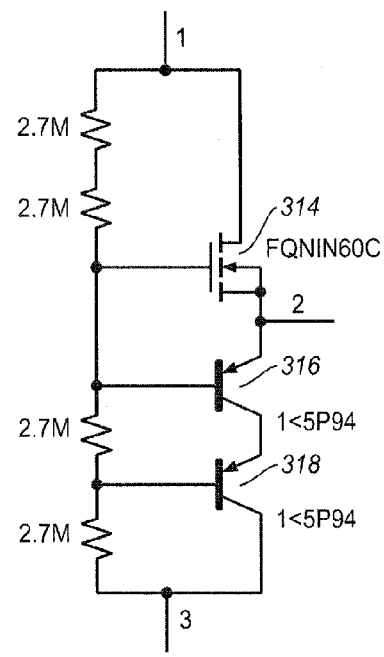
FIG. 6 is a schematic diagram of an exemplary implementation of an X1 buffer.

FIG. 6 is schematic diagram of an exemplary implementation of the X1 buffer 312 according to an embodiment of the invention. As shown, the X1 buffer 312 itself may include transistors 314, 316, and 318. In one embodiment, transistor 314 can be implemented with a MOSFET, such as a FQNIN60C, available from Fairchild Semiconductor Corp.; and each of transistors 316 and 318 can be implemented with a BJT, such as a KSP94, also available from Fairchild Semiconductor Corp. It should be understood, however, that transistors 314, 316, and 318 can be implemented with other suitable devices.

Referring to FIGS. 4-6, in operation, if capacitors C28 and C29 have the same leakage currents by chance, that is, are balanced the voltage on each capacitor would be the same, and no corrective current is required from high-voltage input capacitor balancing circuit 300 through resistor R28. Within the high voltage input capacitor balancing circuit 300, some current flows through the resistors R2, R3, R4, and R5 of voltage divider 310 to establish voltage reference levels, but the amount of current will be relatively small as compared to a typical bleed current that would be required for passive balancing (which does not include the X1 buffer 312). In X1 buffer 312, the transistors 314, 316, and 318 are turned off so that no current flows. Thus, the high voltage input capacitor balancing circuit 300 does not consume significant power when capacitors C1 and C2 are balanced. However, if capacitors C28 and C29 are not balanced, then the X1 buffer 312 provides current through resistor R28 to actively drive the capacitor balance. This current is sourced through transistor 314 or 316, 318, which is turned on by the voltage difference between the input voltage to the buffer established by divider R28-1, R28-2, R29-1, and R29-2, and the voltage on input filter capacitors common connection. If the buffer input is positive relative to the capacitor common voltage, 314 is tuned on. If the relative buffer input is negative, 316 and 318 are turned on and 314 remains off.

In addition, high voltage input capacitor balancing circuit 300 can also provide a buffered voltage equal to, for example, one-half the input voltage for a controller in the power supply that has a HV startup pin. The MOSFET implementation for transistor 314 can provide extra gain to drive the high-voltage startup controller pin of the controller. Note: 314 could also be implemented using a high gain BJT such as a Darlington transistor. Controllers with HV startup pins turn off the current draw after startup so are very efficient. This combined with the active balance circuit can greatly improve power supply efficiency.

FIGS. 7A through 7G are a schematic diagrams of exemplary implementations of a high voltage input capacitor balancing and startup circuit.

Figure 7A:
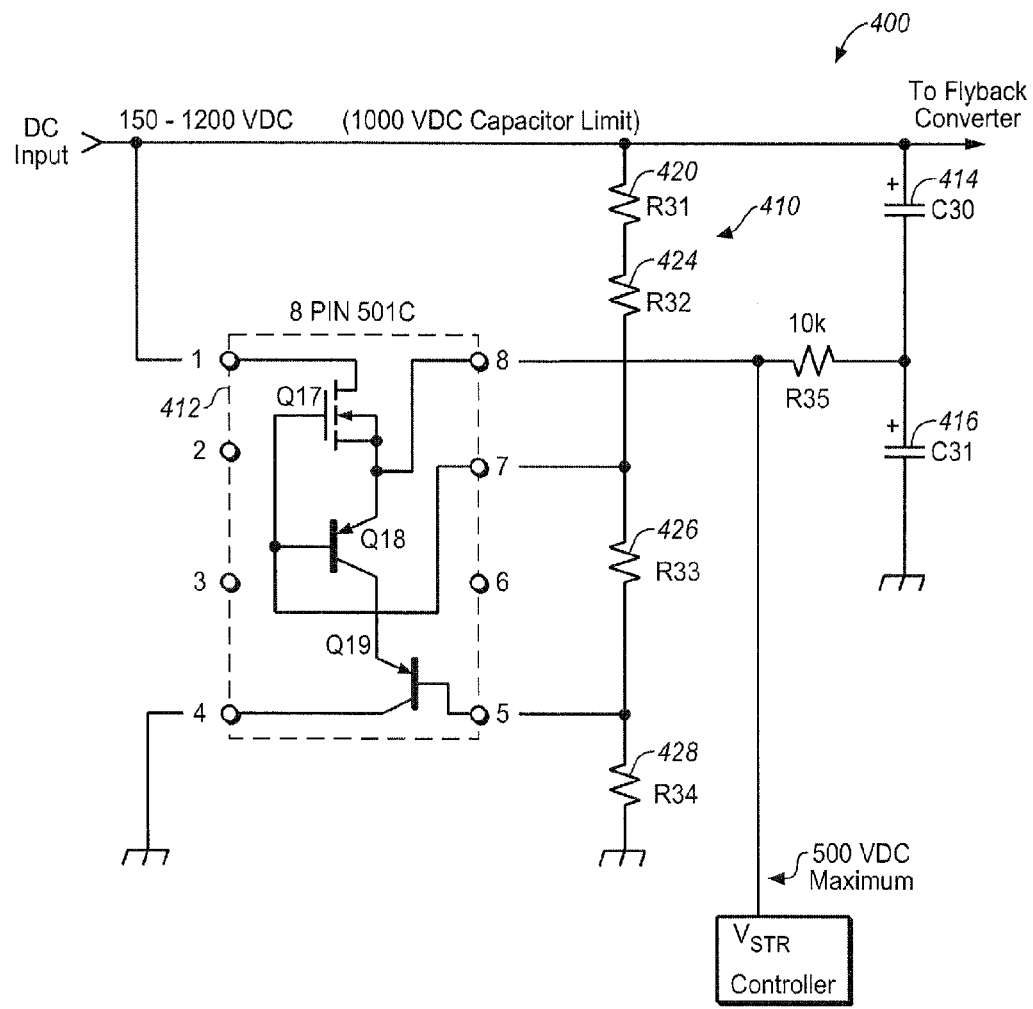
FIGS. 7A through 7G are a schematic diagrams of exemplary implementations of a high voltage input capacitor balancing and startup circuit.

Referring to FIG. 7A, an exemplary implementation of a high voltage input capacitor balancing and startup circuit 400, according to an embodiment of the invention, can provide active balance for two input capacitor configuration (capacitors C30 and C31) used as an input filter for a power supply. High voltage input capacitor balancing circuit 400 can also provide startup voltage for the controller in a power supply.

As shown, high voltage input capacitor balancing circuit 400 includes voltage divider 410 and a X1 ("times one") buffer 412. In one embodiment, the X1 buffer 412 can be packaged in SOIC (small-outline integrated circuit) package with 8 pins. Voltage divider 410 can be implemented with resistors R31, R32, R33 and R34, having values which provide the desired lower bleed current (e.g., one-fifth to one-twentieth the normal required bleed current).

Figure 7B:
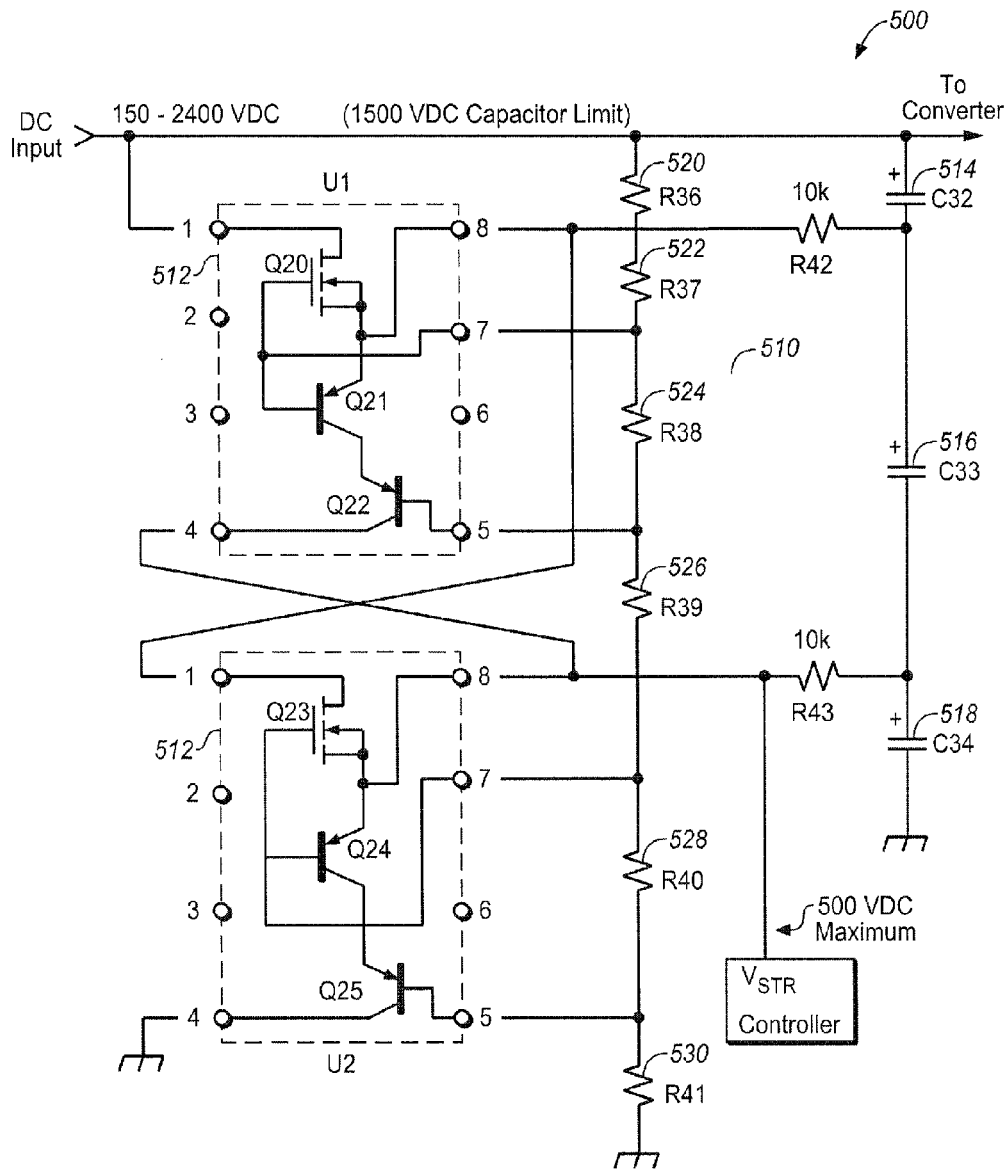

FIG. 7B is schematic diagram of an exemplary implementation of a high voltage input capacitor balancing and startup circuit 500 according to an embodiment of the invention. High voltage input capacitor balancing circuit 500 can provide active balance for a three input capacitor configuration (capacitors C32, C33 and C34) used as an input filter for a power supply. High voltage input capacitor balancing circuit 500 can also provide startup voltage for the controller in a power supply.

Figure 7C:
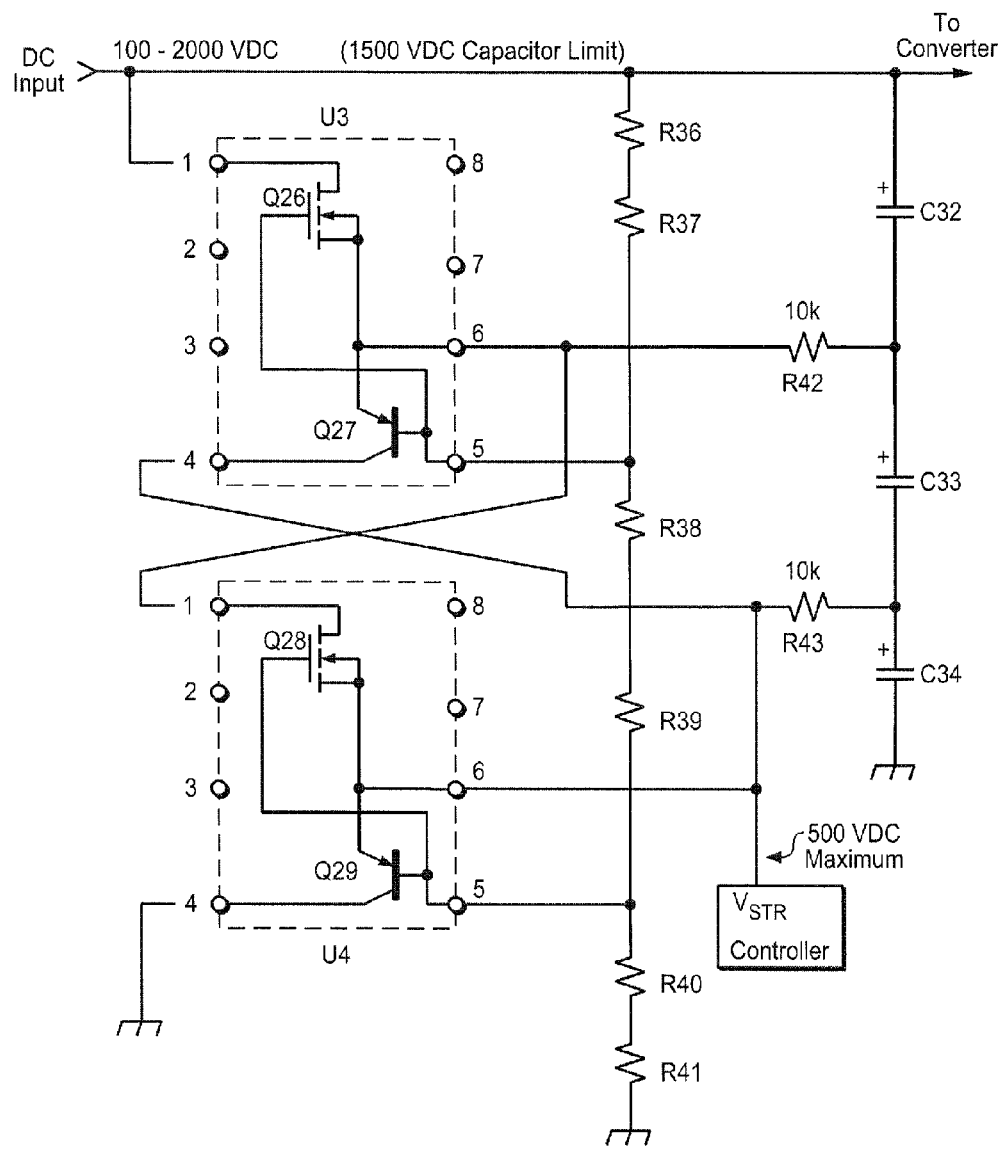
Figure 7D:
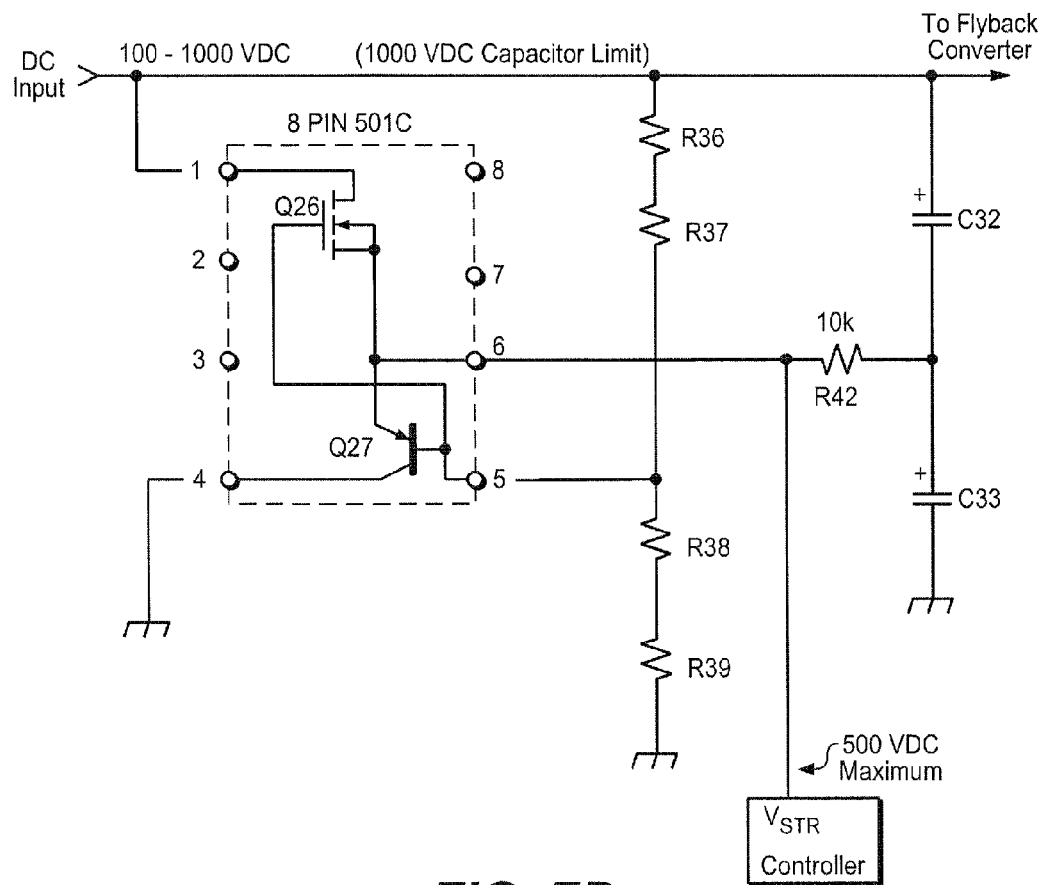
Figure 7E:
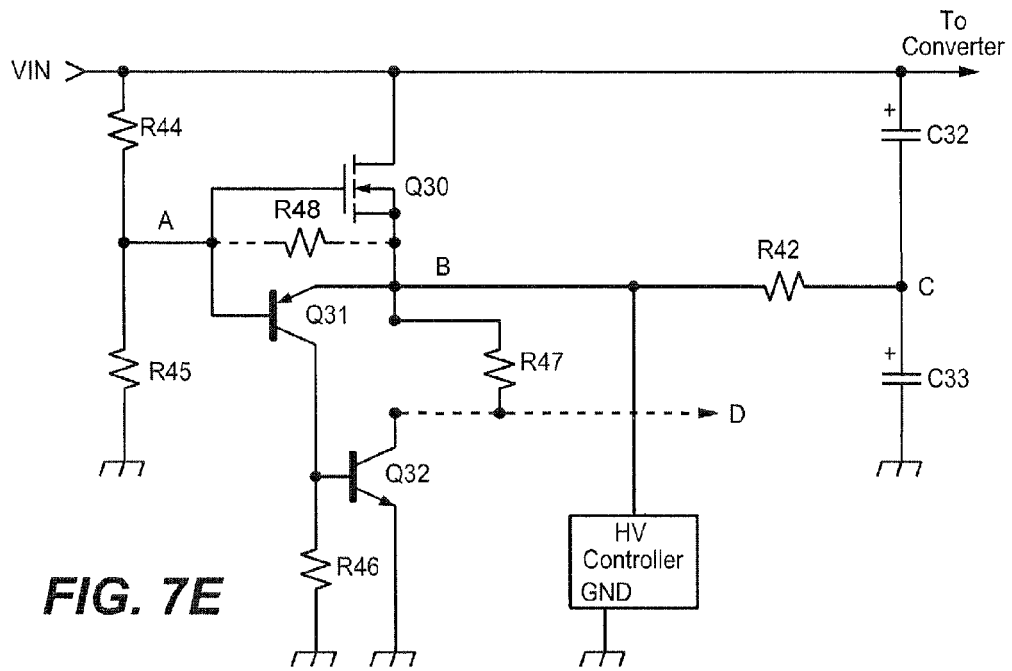
Figure 7F:
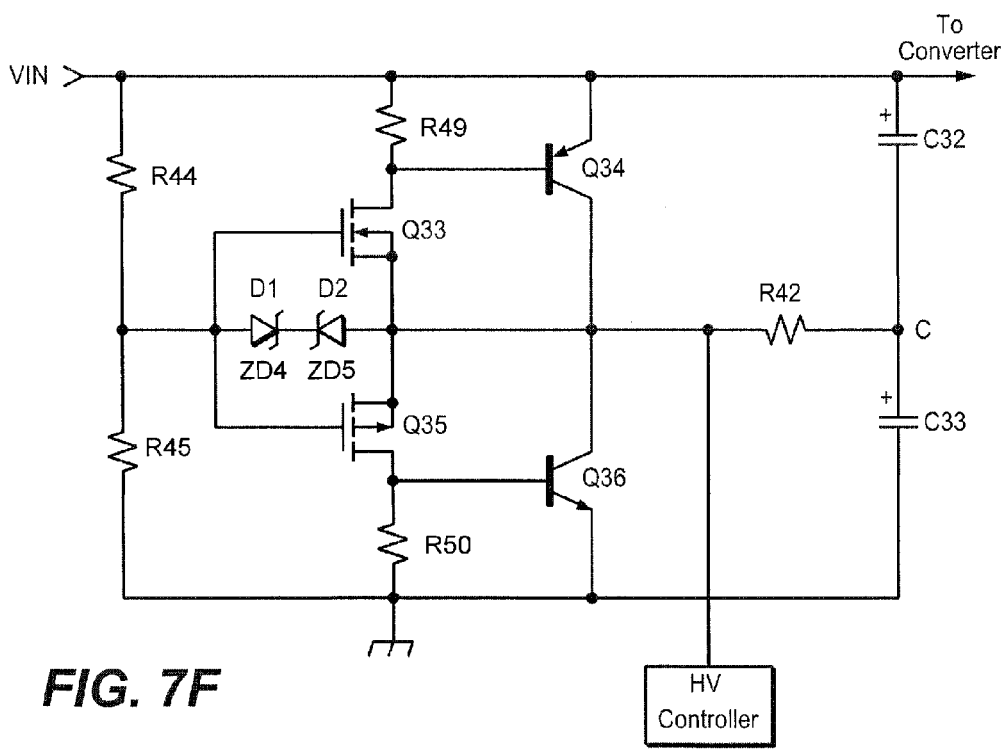
Figure 7G:
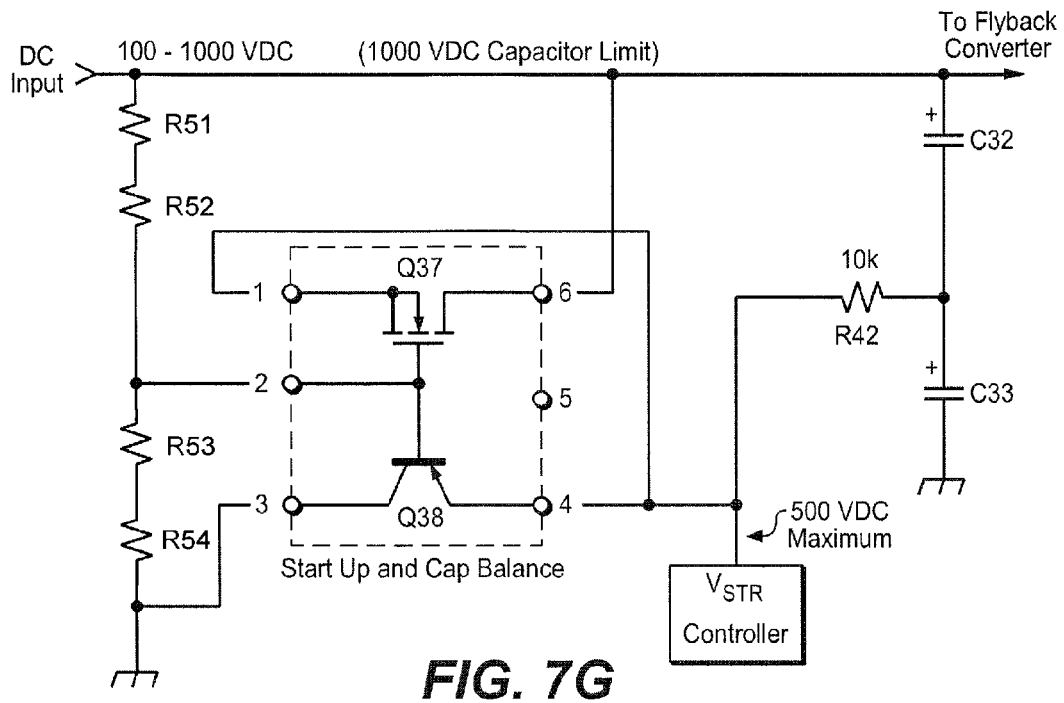

FIG. 7C illustrates that the start up and balance circuits can be stacked in a similar manner to the input capacitors to provide capacitor balance for any number of input capacitors or input voltage. For example, in one embodiment, four input capacitors would require three start up and balance circuits in stacked arrangement. Six input capacitors would require five stacked start up and balance circuits.

As shown in FIG. 7B, high voltage input capacitor balancing circuit 500 includes voltage divider 510 and two X1 ("times one") buffers 512. In one embodiment, each X1 buffer 512 can be packaged in a SOIC package with 8 pins. The X1 buffers 512 can be stacked to balance capacitors C32, C33 and C34. Voltage divider 510 can be implemented with resistors R36, R37, R38, R39, R40 and R41 having values which provide the desired lower bleed current (e.g., one-fifth to one-twentieth the normal required bleed current).

From the foregoing, it would seem that active capacitor balancing would be very useful in high-voltage low-power supplies where standby power was important. However, as power output gets larger so does the input capacitor value and the resultant leakage. From this, it can be seen that virtually any power supply can benefit if minimum load efficiency is important.

FIGS. 7D through 7G are schematic diagrams of further exemplary implementation of input capacitor balancing and startup circuits, according to embodiments of the invention.

Low Voltage Capacitor Balancing Circuit

Capacitive balancing may also be an issue at low voltages when using high capacitive value capacitors such as "Supercapacitors" or "Supercaps." Supercaps typically have voltage ratings typically below 6 volts, and so must be stacked to increase the voltage at which they can function. Additionally, low voltage capacitors, such as Supercaps, are very sensitive to over-voltage and thus must be balanced carefully. Finally, the energy storage capacity of such capacitors is very high so the resistive balancing methodology may be inappropriate especially during charge and discharge.

In one embodiment, low voltage capacitors are balanced without excessive bleed current, thereby increasing power supply efficiency. Such embodiment can reduce the traditional divider losses by up to 90% or more.

Figure 8:
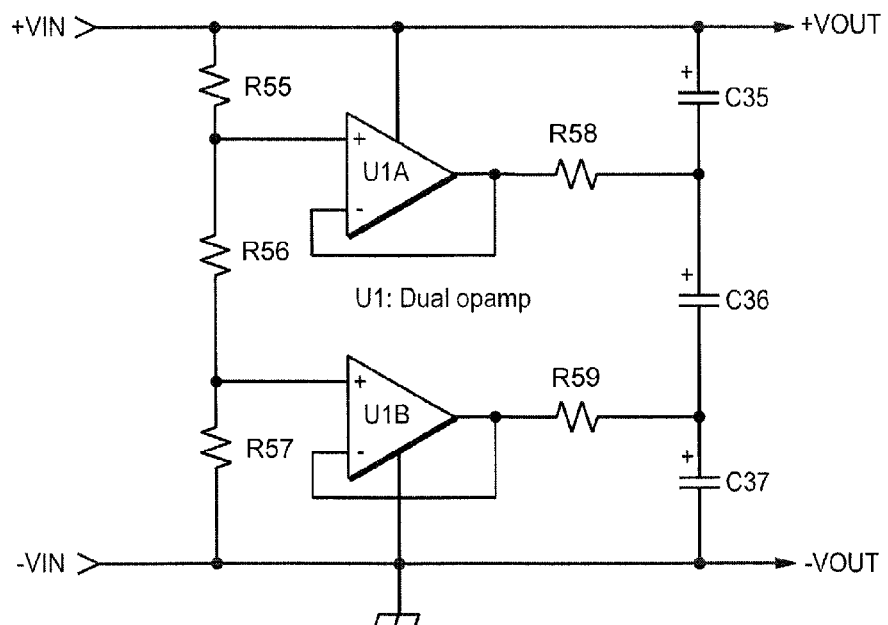
FIG. 8 is schematic diagram of an exemplary implementation of a power supply.

FIG. 8 is schematic diagram of an exemplary implementation of a power supply 600 according to an embodiment of the invention. Such power supply 600 could be used or incorporated in device, such as, for example, smart meter output voltage storage, that is subject to or used in a wide range of applications. The power supply 600 can be connected to a power source at an input terminal and operate with a wide range of input voltages, for example, approximately 6 to 20 DC. The power supply 600 provides power for the device (e.g., smart meter) at an output terminal These balancing circuits can be stacked along with additional capacitors for higher voltage applications.

Power supply 600 includes low voltage capacitors C35, C36 and C37 in stacked arrangement. Each capacitors C35, C36 and C37 may have high energy storage capacity and relatively low voltage rating. These capacitors can each be implemented with a Supercapacitor. Resistors R55, R56 and R57 form a voltage divider that evenly divides the input voltage among the three stacked capacitors C35, C36 and C37. Resistors R58 and R59 limit the drive current to capacitors C35, C36 and C37. Each of operational amplifiers U1$a$ and U1$b$ can be implemented as a buffer amplifier (e.g., with approximately x1 gain). With this arrangement, the low voltage capacitors C35, C36 and C37 can be used at higher voltages and in many applications where they previously could not be used.

Figure 9:
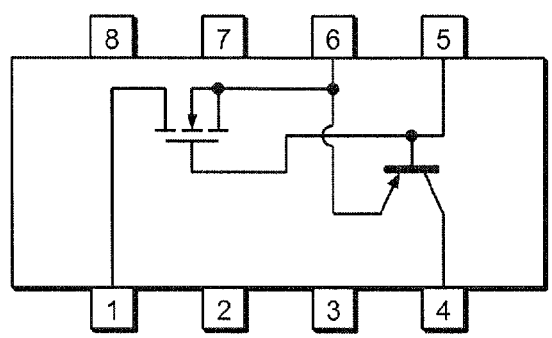
FIG. 9 is an exemplary equivalent circuit diagram and layout for capacitor balancing and startup circuits.
Figure 9:
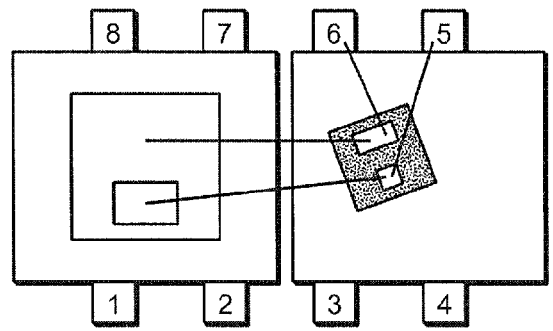

FIG. 9 is an exemplary equivalent circuit diagram and layout (with 2 dies or "chips") for capacitor balancing and startup circuits.

Although the present invention and its advantages have been described in detail, it should be understood that various changes, substitutions, and alterations can be made therein without departing from the spirit and scope of the invention. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function.

What is claimed is:

1. A startup circuit for a power supply, the startup circuit comprising:
 a resistance coupled between a voltage source and a first node;
 a first capacitor coupled to the first node, the first capacitor operable to be charged by current flowing through the resistance;
 a first transistor having an emitter, a base, and collector, wherein the collector is coupled to the voltage source and the base is coupled to the first node;
 a diac circuit coupled to the emitter of the first transistor, the diac circuit operable to fire to turn on the first transistor, thereby allowing discharge of the first capacitor through the base-emitter junction of the first transistor; and
 a second capacitor operable to be charged by current related to a discharge voltage resulting from the firing of the diac circuit, the second capacitor operable to store charge to provide VCC voltage to a controller of the power supply.

2. The startup circuit of claim 1, comprising a second transistor operable to shunt the charging current for the first capacitor once the VCC voltage is sufficient to start the controller of the power supply.

3. The startup circuit of claim 1, comprising a second transistor and a diode operable, once the VCC voltage is sufficient to operate the controller, to discharge the first capacitor so that voltage at the base of the first transistor does not rise to a level to cause the diac circuit to conduct.

4. The startup circuit of claim 1, comprising a second transistor operable to shunt the charging current for the first capacitor once the VCC voltage is sufficient to start the controller of the power supply.

5. The startup circuit of claim 1, wherein the resistance comprises a plurality of resistors coupled in series.

6. A startup circuit for providing a bias voltage, the startup circuit comprising:
 a resistance coupled between a voltage source and a first node;
 a first capacitor coupled to the first node, the first capacitor operable to be charged by current flowing through the resistance;
 a first transistor having a first terminal, a second terminal, and a control terminal, wherein the first terminal is coupled to the voltage source and the control terminal is coupled to the first node;
 a diac circuit coupled to the second terminal of the first transistor, the diac circuit operable to fire to turn on the first transistor, thereby allowing discharge of the first capacitor through the control-second terminal junction of the first transistor; and
 a second capacitor operable to be charged by current related to a discharge voltage resulting from the firing of the diac circuit, the second capacitor operable to store charge to provide the bias voltage.

7. The startup circuit of claim 6, comprising a second transistor operable to shunt the charging current for the first capacitor once the bias voltage is sufficient.

8. The startup circuit of claim 6, comprising a second transistor and a diode operable, once the bias voltage is sufficient, to discharge the first capacitor so that voltage at the control terminal of the first transistor does not rise to a level to cause the diac circuit to conduct.

9. The startup circuit of claim 6, wherein the resistance comprises a plurality of resistors coupled in series.

10. The startup circuit of claim 6, wherein the first transistor comprises a bipolar junction transistor and the first terminal comprises a collector, the second terminal comprises an emitter, and the control terminal comprises a base.

11. The startup circuit of claim 6, wherein the first transistor comprises a metal-oxide semiconductor field effect transistor and the first terminal comprises a drain, the second terminal comprises a source, and the control terminal comprises a gate.

12. A power supply comprising:
 a resistance coupled between a voltage source and a first node;
 a first capacitor coupled to the first node, the first capacitor operable to be charged by current flowing through the resistance;
 a first transistor having a first terminal, a second terminal, and a control terminal, wherein the first terminal is coupled to the voltage source and the control terminal is coupled to the first node;
 a diac circuit coupled to the second terminal of the first transistor, the diac circuit operable to fire to turn on the first transistor, thereby allowing discharge of the first capacitor through the control-second terminal junction of the first transistor; and
 a second capacitor operable to be charged by current related to a discharge voltage resulting from the firing of the diac circuit, the second capacitor operable to store charge to provide a supply voltage.

13. The power supply of claim 12, comprising a second transistor operable to shunt the charging current for the first capacitor once the voltage of the second capacitor is sufficient for the supply voltage.

14. The power supply of claim 12, comprising a regulator for regulating the supply voltage.

15. The power supply of claim 14, wherein the regulator comprises a second transistor, a Zener diode, and a resistor.

16. The power supply of claim 12, comprising a second transistor and a diode operable, once the voltage of the second capacitor is sufficient for the supply voltage, to discharge the first capacitor so that voltage at the control terminal of the first transistor does not rise to a level to cause the diac circuit to conduct.

17. The power supply of claim 12, wherein the resistance comprises a plurality of resistors coupled in series.

18. The power supply of claim 12, wherein the first transistor comprises a bipolar junction transistor and the first terminal comprises a collector, the second terminal comprises an emitter, and the control terminal comprises a base.

19. The power supply of claim 12, wherein the first transistor comprises a metal-oxide semiconductor field effect transistor and the first terminal comprises a drain, the second terminal comprises a source, and the control terminal comprises a gate.

* * * * *